United States Patent
Grove-Nielsen

(10) Patent No.: US 9,410,529 B2
(45) Date of Patent: Aug. 9, 2016

(54) ROTOR BLADE FOR A WIND TURBINE

(71) Applicant: SIEMENS AKTIENGESELLSCHAFT, München (DE)

(72) Inventor: Erik Grove-Nielsen, Roslev (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/816,542

(22) Filed: Aug. 3, 2015

(65) Prior Publication Data

US 2015/0337797 A1   Nov. 26, 2015

Related U.S. Application Data

(63) Continuation of application No. 13/490,655, filed on Jun. 7, 2012, now abandoned.

(30) Foreign Application Priority Data

Jun. 10, 2011 (EP) .................... 11169517

(51) Int. Cl.
*F03D 1/00* (2006.01)
*F03D 1/06* (2006.01)

(52) U.S. Cl.
CPC ............... *F03D 1/001* (2013.01); *F03D 1/065* (2013.01); *F03D 1/0658* (2013.01); *F03D 1/0675* (2013.01); *F03D 1/0691* (2013.01); *F05B 2240/40* (2013.01); *F05B 2240/80* (2013.01); *F05B 2240/90* (2013.01); *Y02E 10/721* (2013.01); *Y02E 10/728* (2013.01)

(58) Field of Classification Search
CPC ..... F03D 1/0633; F03D 1/0641; F03D 1/065; F03D 1/0675; F03D 1/0683; F03D 1/0691; F03D 1/0658
USPC ...... 416/204 R, 204 A, 205, 207–209, 214 R, 416/214 A, 219 A, 220 A, 239, 244 R, 244 A, 416/248, 174, 241 A, 229 R, 230, 226
See application file for complete search history.

(56) References Cited

U.S. PATENT DOCUMENTS

| 4,915,590 | A | 4/1990 | Eckland et al. |
|---|---|---|---|
| 2005/0106029 | A1* | 5/2005 | Kildegaard ........... B29C 70/525 416/229 R |
| 2010/0043318 | A1 | 2/2010 | Ambrecht et al. |
| 2011/0020131 | A1* | 1/2011 | Petersen ............ B29D 99/0025 416/226 |
| 2011/0044817 | A1 | 2/2011 | Bendel et al. |
| 2012/0045343 | A1 | 2/2012 | Hancock et al. |

FOREIGN PATENT DOCUMENTS

| DE | 10011464 C1 | 8/2001 |
|---|---|---|
| EP | 1959129 A2 | 8/2008 |
| EP | 1975405 A2 | 10/2008 |

(Continued)

*Primary Examiner* — Christopher Verdier

(57) ABSTRACT

A rotor blade for a wind turbine has an elongate blade base body with a plurality of connecting elements. Each connecting element comprises at least one axially extending connecting portion adapted to be connected with corresponding connecting portions of a rotor hub of the wind turbine. The connecting elements are connected in a circumferential direction so as to build a closed ring-shape.

12 Claims, 3 Drawing Sheets

(56) References Cited

FOREIGN PATENT DOCUMENTS

| | | | |
|---|---|---|---|
| EP | 2400147 | A1 | 12/2011 |
| FR | 2863321 | A1 | 6/2005 |
| WO | WO 03057457 | A1 | 7/2003 |
| WO | WO 2009132612 | A1 | 11/2009 |
| WO | WO 2010067082 | A2 | 6/2010 |
| WO | WO 2010092168 | A2 | 8/2010 |

* cited by examiner

ROTOR BLADE FOR A WIND TURBINE

CROSS REFERENCE TO RELATED APPLICATIONS

This application is a continuation of abandoned application Ser. No. 13/490,655 filed Jun. 7, 2012, which claims priority of European Patent Office application No. 11169517.7 EP filed Jun. 10, 2011. All of the applications are incorporated by reference herein in their entirety.

FIELD OF INVENTION

A rotor blade for a wind turbine, having an elongate blade base body with a number of connecting elements each comprising at least one axially extending connecting portion adapted to be connected with corresponding connecting portions of a rotor hub of a wind turbine is provided.

BACKGROUND OF INVENTION

Rotor blades for wind turbine are usually built as fibre-reinforced hollow composite structures. Hence, they are usually fabricated by impregnating respective aligned and orientated fibres or fibre clutches with a casting or resin material respectively. Thereby, removing of the cast rotor blade is oftentimes problematic since particularly in the region of the ring-like shaped root of the blade ovalisation may occur due to the self-weight of the rotor blade. Respective ovally shaped or deformed rotor blades are difficult to machine and particularly difficult to mount on a respective rotor hub of a wind turbine.

SUMMARY OF INVENTION

It has been proposed to strengthen the blade root by inserting respective metal rings in the region of the blade root while or before moulding. Another proposal to enhance the mechanical properties, in particular the stiffness of the blade root is to provide bulky circular plates with the blade root. Both approaches for strengthening respective blade roots are deemed as comparatively cumbersome.

Provided is a rotor blade having a constructively simple design with enhanced mechanical properties in the region of the blade root.

A rotor blade is described, wherein the connecting elements are connected in circumferential direction so as to build a closed ring-shape.

The present technique is based on the idea to provide the blade root with respective circumferentially disposed and circumferentially connected or interconnected connecting elements which connecting elements build a closed ring or ring-like shape when connected. The respective ring built of the respective, particularly ring-segment-shaped, connecting elements is disposed in the region of the blade root. Thus, the respective ring built of the respective connecting elements provides the blade root with mechanical stability so that ovalisation effects originating from the self-weight of the rotor blade may be avoided or at least reduced.

The connecting elements, which may be deemed as studs or the like, are easily attached in the mould for manufacturing the rotor blade. There is no need to insert respective axial spacer bars or the like between the connecting elements. Hence, the manufacturing process of respective rotor blades is easier.

The number of the respective connecting elements is at least two, so that each of the connecting elements extends about an angle of 180° in this case. For the case of uniformly shaped connecting elements, each connecting element depends about an angle of 360°/n, whereby n is the number of the respective connecting elements. Of course, it is alternatively possible, that the connecting elements are not uniformly shaped, so that first connecting elements extend about a first angle and second connecting elements extend about a second angle, whereby all respective first and second connecting elements build a ring when connected.

Each connecting element may comprise at least one circumferentially extending connecting means for interconnecting the respective connecting elements with a corresponding circumferentially extending connecting means of at least one adjacently disposed connecting element. The circumferentially extending connecting means provides a mechanically stable connection regarding the joint of respective circumferentially adjacently disposed connecting elements. The connection may be non-detachable or detachable, whereby the latter case eases maintenance and handling of the respective connecting elements.

Alternatively or additionally, it is possible that each connecting element comprises at least one radially extending connecting means for connecting a respective connecting element with a corresponding radially extending connecting means of at least one ring number having a radially outer and/or inner position with respect to the connecting elements. The at least one ring member provides the arrangement of the circumferentially aligned connection members with mechanical stability since each of the connecting members is firmly connected to the respective ring member by at least one radially extending connecting means. The respective ring members may be radially adjacently disposed to the respective connecting elements so that the ring members are directly contacted with the radial outer and/or inner diameter of the respective connecting elements.

If the connecting elements are both connected to a radially outer ring member and a radially inner ring member, i.e. the connecting members are disposed in between the radially outer ring member and the radially inner ring member, a sandwich construction is given. Thereby, the ring members serve as stiff outer layers and the connecting elements serve as a respective intermediate layer disposed in between the outer layers. Respective sandwich structures provide high bending stiffness, so that the blade root may be provided with additional mechanical stability.

The circumferentially extending and/or radially extending connecting means may be built as a form closure element. Form closure elements allow both non-detachable and detachable connections of respective joining partners in dependence of the constructive design of the respective connecting means. Generally, the form closure elements provide mechanical stable connections of respective joining partners, i.e. the connecting elements among each other and/or the connecting elements and the respective ring members.

The form closure elements may be built as a protrusion or a corresponding recess in the most general embodiment. Specific geometries of the form closure elements such as dove tail-like protrusions or dove tail-like recesses are merely of exemplary nature. It is understood that other shapes of protrusions and corresponding recesses, allowing respective snap-fit connections for instance, are applicable as well.

Generally, it is possible that the circumferentially extending connecting means is adjacently disposed to the radially outer or inner border of a respective connecting element with respect to the centre axis of the rotor blade. The concrete radial location of the circumferentially extending connecting means may lead to differences in the mechanical stability of the circumferentially connection of the respective connecting elements. Concerning a single connecting element, radially outer positions of the circumferentially arranged connecting means provide higher bending stiffness. Of course, the same applies to the connecting elements as well, i.e. the closer they are disposed in relation to the outer diameter of the blade root, the more stiffening they will behave.

A respective connecting element may have a symmetrical or an asymmetrical shape with respect to its circumferentially aligned longitudinal axis. The circumferentially aligned longitudinal axis is defined as the mean line circumferentially extending through the respectively connected connecting elements. It is understood that respective connecting elements are three-dimensional components extending in axial, circumferentially and radial direction, whereby the outer contour of the connecting element is mainly defined by the respective outer contour of the rotor blade. Generally, the connecting elements may be differently shaped as long as they build an at least essentially ring-like shape when connected in order to provide the blade root with additional mechanical stability.

Aside, the present invention relates to a wind turbine, particularly a direct drive wind turbine, comprising a rotor hub having at least one rotor blade attached thereto. The rotor blade is of the type as has been described before.

BRIEF DESCRIPTION OF THE DRAWINGS

In the following, the invention is described in detail as reference is made to the figures, whereby.

DETAILED DESCRIPTION OF INVENTION

Figure 1:
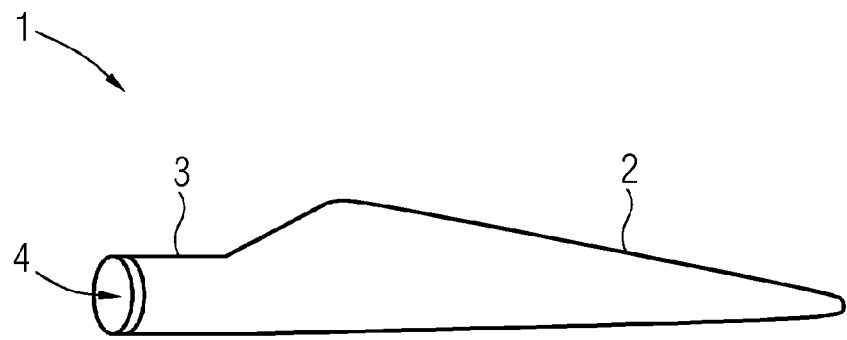
FIG. 1 shows a principle view of a rotor blade according to an exemplary embodiment of the invention.

FIG. 1 shows a principle view of a rotor blade 1 according to an exemplary embodiment of the invention. The rotor blade 1 comprises an elongate base body 2 which axially ends in a respective blade root 3 having a respective circular root face side 4 (cf. FIG. 2). The rotor blade 1 is a hollow component made of a fibre-reinforced resin or cast material. The rotor blade 1 is attachable to a rotor hub of a wind turbine, particularly a direct drive wind turbine (not shown).

Figure 2:
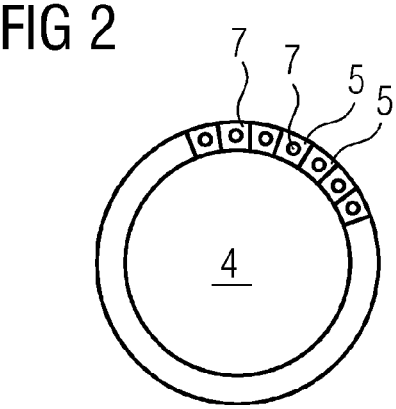
FIG. 2 shows a principle view of a face side of the rotor blade of FIG. 1.

As is shown in FIG. 2, the face side 4 of the blade root 3 has a ring-like shape, whereby respective connecting elements 5 (cf. FIG. 3) are connected in circumferential direction so as to build a circumferentially closed ring-shape.

Figure 3:
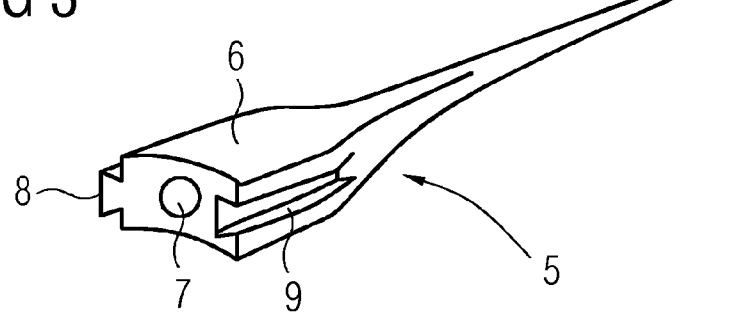
FIG. 3 shows a perspective view of a connecting element according to an exemplary embodiment of the invention.

The connecting elements 5, which may also be denoted as studs, are shown in FIG. 3. A respective connecting element 5 comprises an axially extending base body 6 having an axially extending connecting portion 7 in the shape of a threaded hole. The axially extending connecting portion 7 is adapted to be connected with corresponding connecting portions of a rotor hub of a wind turbine (not shown). The axially extending connecting portion is built as bore having an inner thread, the corresponding connecting portion of the rotor hub is a threaded bolt.

Additionally, the base body 6 is provided with circumferentially extending connecting means in the shape of form closure elements, ie a protrusions 8 and corresponding recesses 9. In such a manner, the respective connecting elements 5 may be circumferentially connected so as to build the closed ring as is shown in FIG. 2.

As is discernible from FIG. 3, both the protrusion 8 and the recess 9 are shaped as corresponding dove tails. It is understood that the circumferentially connecting means of the respective connecting elements 5 may be shaped differently shaped corresponding form closure elements as well.

Figure 4:
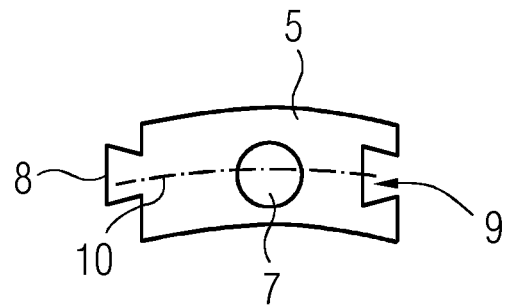
FIG. 4-7 show cross-sectional views of further connecting elements according to exemplary embodiments of the invention.

The FIGS. 4 to 7 show cross-sectional views of connecting elements 5 according to exemplary embodiments of the invention. Thereby, the embodiment shown in FIG. 4 shows a respective connecting element 5 having a comparatively narrow single dove tail as a protrusion 8 and corresponding recess 9. The connecting element 5 is highly symmetrical with respect to its circumferentially aligned longitudinal axis (10).

Figure 5:
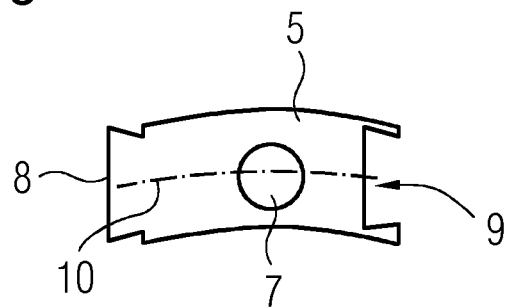

FIG. 5 shows a like embodiment of a respective connecting element 5, whereby the protrusion 8 and the recess 9 are enlarged. The connecting element 5 is highly symmetrical with respect to its circumferentially aligned longitudinal axis (10).

Figure 6:
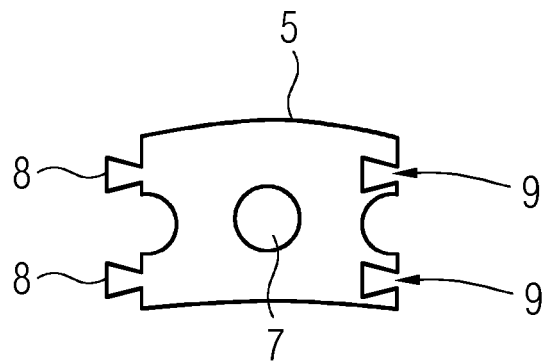

The embodiment of FIG. 6 shows that a connecting element 5 may comprise more than two respective protrusions 8 and accordingly recesses 9 on the respective circumferentially sides. Thereby, the connecting element 5 is provided with respective protrusions 8 and recesses 9 in radially outer and radially inner positions, i.e. the respective protrusions 8 and recesses 9 are disposed at the radially inner and outer borders of the connecting elements 5. The connecting element 5 of FIG. 6 is also symmetrical.

Figure 7:
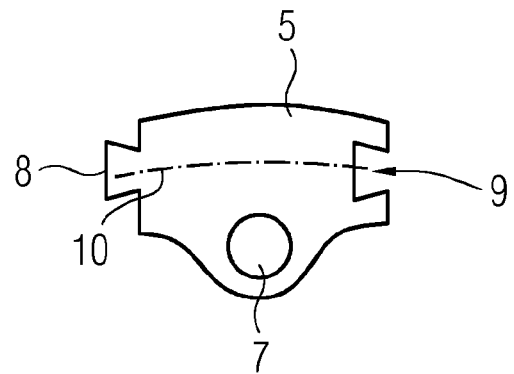

FIG. 7 shows an embodiment of the respective connecting element 5 having an asymmetrical shape with respect to its circumferentially aligned longitudinal axis 10. The radially inner diameter of the connecting element 5 is provided with a radially inwardly extending curved shape of jut.

Figure 8:
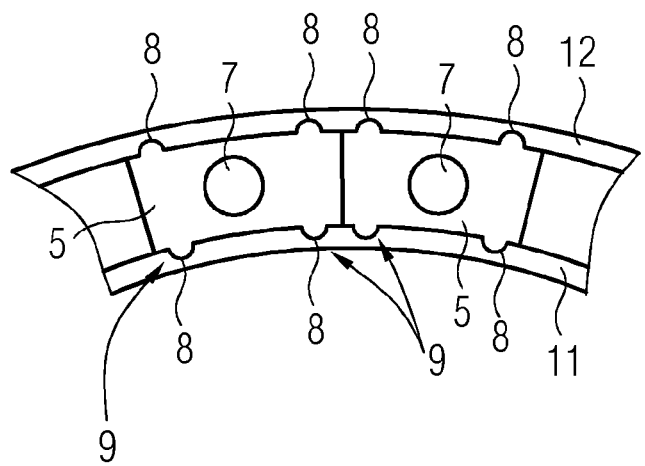
FIG. 8 shows a partial cut-view of a face side of a rotor blade according to an exemplary embodiment of the invention.

FIG. 8 shows a partial cut-view of a face side 4 of a rotor blade 1 according to an exemplary embodiment of the invention. In contrast to the preceding embodiments, the connecting element 5 is disposed between an inner ring member 11 and an outer ring member 12, so that the entire construction of the blade root 3 of the rotor blade 1 may be deemed as a sandwich construction. Thereby, the respective ring members 11, 12 serve as outer layers, whereas the connecting element 5 serves as an intermediate layer in between the outer layers.

This embodiment provides high bending stiffness, since the respective rings 11, 12 are made of a highly stiff material such as steel or the like. The connection between the ring members 11, 12 and the connecting element 5 is provided by radially extending connecting means, i.e. respective radially extending protrusions 8 in the shape of knobs extending in respective radially extending recesses 9 within the ring members 11, 12. In such a manner, shear forces between the ring members 11, 12 and the connecting element 5 may be encountered.

Figure 9:
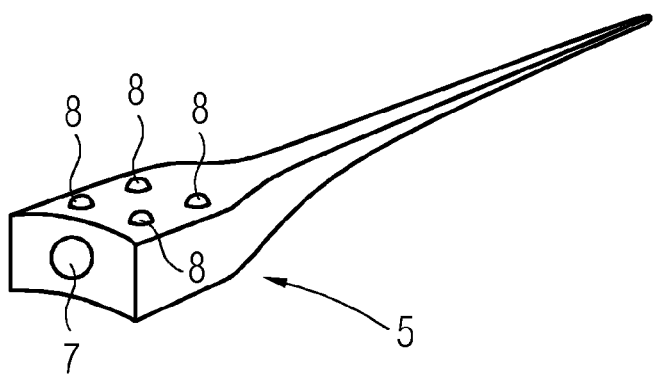
FIG. 9 shows a perspective view of the connecting element of FIG. 8.

FIG. 9 shows a respective perspective view of the connecting element 5 of FIG. 8 clearly indicating the respective protrusions 8 in the shape of knobs radially extending off the outer diameter of the connecting element 5. Of course, the inner diameter of the connecting element 5 is likewise provided with respective protrusions 8.

The inventive principle allows mechanical strengthening of the root blade 3 of a respective rotor blade 1 so that the occurrence of ovalisation effects due to the self-weight of the rotor blade 1 after its manufacturing process may be reduced or inhibited. Hence, the attachment of respective rotor blades 1 to a rotor hub of a wind turbine is facilitated since the circular shape of the blade root 3 of the rotor blade 1 may be kept in its original state, ie geometric deviations may be avoided.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A wind turbine rotor blade, comprising:
    an elongate blade base body, the elongate base body transitions to a circular blade root with a circular face side; and
    a plurality of connecting elements disposed in the circular blade root, each of the plurality of connecting elements comprising:
        an axially extending connecting portion configured to be connected with corresponding connecting portions of a rotor hub of a wind turbine,
        a circumferentially extending protrusion, and
        a corresponding circumferentially extending recess,
        wherein adjacently disposed connecting elements of the plurality of connecting elements are interconnected via the circumferentially extending protrusion of a first of the adjacently disposed connecting elements and the corresponding circumferentially extending recess of a second of the adjacently disposed connecting elements, each of the interconnections being mechanically stable in a radial direction and in a circumferential direction,
        wherein a mechanical stiffening occurs in the blade root via the interconnection of the plurality of connecting elements into a closed ring-shaped arrangement, and
        wherein the plurality of connecting elements comprises at least one radially extending connector configured to connect the respective connecting element with a corresponding radially extending connector of a ring member having a radially outer and/or inner position with respect to the connecting elements.

2. The wind turbine rotor blade according to claim 1, wherein each of the plurality of connecting elements have a ring-segment-like shape.

3. The wind turbine rotor blade according to claim 1, wherein the plurality of connecting elements comprises a plurality of radially extending connectors.

4. The wind turbine rotor blade according to claim 1, wherein the circumferentially extending protrusion is a dovetail-like protrusion and the circumferentially extending recess is a corresponding dovetail-like recess.

5. The wind turbine rotor blade according to claim 1, wherein the circumferentially extending protrusion is adjacently disposed to the radially outer border of a respective connecting element with respect to the centre axis of the rotor blade.

6. The wind turbine rotor blade according to claim 1, wherein the circumferentially extending protrusion is adjacently disposed to the radially inner border of a respective connecting element with respect to the centre axis of the rotor blade.

7. The wind turbine rotor blade according to claim 1, wherein each connecting element has a symmetrical shape with respect to its circumferentially aligned longitudinal axis.

8. The wind turbine rotor blade according to claim 1, wherein each connecting element has an asymmetrical shape with respect to its circumferentially aligned longitudinal axis.

9. The wind turbine rotor blade according to claim 1, wherein the mechanical stiffing is such that an ovalization effect of the self-weight of the rotor blade is minimized.

10. The wind turbine rotor blade according to claim 9, wherein the mechanical stiffing is such that the ovalization effect of the self-weight of the rotor blade is prevented.

11. The wind turbine rotor blade according to claim 1, wherein the interconnecting between the respective connecting element with the adjacently disposed connecting element is an interlocked interconnection.

12. The wind turbine rotor blade according to claim 1, wherein each of the plurality of connecting elements tapers in a direction away from the axially extending connecting portion.

* * * * *